(12) United States Patent
Tafoya et al.

(10) Patent No.: US 6,935,980 B1
(45) Date of Patent: Aug. 30, 2005

(54) INFINITELY VARIABLE GEARED TRANSMISSION

(76) Inventors: Craig Allen Tafoya, 3778 SW. 30th Ave., Ft. Lauderdale, FL (US) 33312; Samuel Barran Tafoya, 135-41st Cir., E., Bradenton, FL (US) 34208

( * ) Notice: Subject to any disclaimer, the term of this patent is extended or adjusted under 35 U.S.C. 154(b) by 0 days.

(21) Appl. No.: 10/930,389

(22) Filed: Aug. 31, 2004

(51) Int. Cl.[7] .................. F16H 37/08; F16H 48/06
(52) U.S. Cl. .................. 475/204; 475/230; 192/3.52
(58) Field of Search ................ 475/201, 204, 475/230; 192/3.52

(56) References Cited

U.S. PATENT DOCUMENTS

| | | | | |
|---|---|---|---|---|
| 2,298,648 A | * | 10/1942 | Russell | 477/60 |
| 2,679,169 A | * | 5/1954 | Duffield | 475/43 |
| 2,744,421 A | * | 5/1956 | Lammerz | 74/665 GA |
| 2,882,750 A | * | 4/1959 | Duffield | 477/64 |
| 3,073,183 A | * | 1/1963 | Kelley | 477/1 |
| 3,710,630 A | * | 1/1973 | Sumiyoshi et al. | 475/63 |
| 3,966,005 A | * | 6/1976 | Binger | 180/6.44 |
| 4,890,508 A | * | 1/1990 | Zaunberger | 475/19 |
| 5,951,434 A | * | 9/1999 | Richards et al. | 475/284 |

* cited by examiner

Primary Examiner—Tisha Lewis
(74) Attorney, Agent, or Firm—Dorothy S. Morse

(57) ABSTRACT

A compact transmission that is infinitely variable and load sensitive. It incorporates a standard hydrodynamic torque converter, however, this converter does not use a lock-up device. Instead engaged gears progressively change ratio output without shifting, thus eliminating the momentary power loss between shifts. It requires no special tooling and can be made from readily available over-the-counter parts. Thus, it is less expensive to manufacture than the transmissions and gearboxes currently used in modern vehicular and marine applications.

20 Claims, 7 Drawing Sheets

INFINITELY VARIABLE GEARED TRANSMISSION

CROSS-REFERENCES TO RELATED APPLICATIONS

None.

BACKGROUND OF THE INVENTION

1. Field of the Invention

This invention relates to the field of transmissions and gearboxes for vehicular and marine applications, specifically to a load sensitive transmission that incorporates a standard hydrodynamic torque converter, however, this converter does not use a lock-up device. Instead engaged gears progressively change ratio output without shifting, thus eliminating the momentary power loss between shifts. In marine applications, the present invention can be used in lieu of controllable pitch propellers, with its park pawl as a shift brake.

2. Description of the Related Art

In modern vehicular applications, most transmissions incorporate a lock-up device for torque multiplication, and during shifts momentary power loss is experienced. Instead of using a lock-up device, the present invention uses engaged gears to progressively change ratio output without shifting until the vehicle has reached a maximum desired speed, thus providing a load sensitive transmission that does not require shifting during acceleration or deceleration, and therefore has no such momentary power loss. There are no geared transmissions known that have the same features and components as the present invention, nor all of its advantages.

BRIEF SUMMARY OF THE INVENTION—OBJECTIVES AND ADVANTAGES

The primary object of this invention is to provide a vehicle transmission having torque multiplication that uses engaged gears to progressively change ratio output without shifting, thus eliminating the momentary power loss between shifts that is commonly experienced by a majority of the transmissions used in modern vehicular applications. It is also an object of this invention to provide a vehicle transmission that is simpler in structure than other known transmissions. It is a further object of this invention to provide a vehicle transmission that is less expensive to manufacture than transmissions currently used in modern vehicular applications. It is also an object of this invention to provide a vehicle transmission that requires no special tooling and can be made from many readily available over-the-counter parts.

The present invention infinitely variable geared transmission eliminates the momentary power loss commonly experienced between shifts by progressively multiplying torque. An input shaft from an associated engine rotates the impeller end of the hydrodynamic torque converter, which is positioned adjacent to a stator and a turbine. As the torque converter rotates, oil is spun outward radially against turbine blades and causes the turbine to rotate. The rotating turbine then causes rotation of the inner primary shaft, the sun gear attached to the output end of the inner primary shaft, and the differential gears situated between the inner primary shaft and the output shaft. The turbine does not cause rotation of the output shaft. However, at this point the outer primary shaft is also turning at input/engine speed, being driven by the stator. The outer primary shaft rotates the clutch assembly and the oil pump, which supplies oil pressure for lubrication and pressure to activate the clutch pack. The oil pump also supplies oil pressure for movement of a gear reduction band associated with the planetary gear assembly and a reverse band associated with the beveled differential gears positioned downstream from the sun gear and planetary gear assembly, and maintains the proper oil capacity in the torque converter. When the stator adjacent to the torque converter is stalled by the discharge of oil in the torus trying to reverse its rotation, such reverse rotation is prevented by engagement of the gear reduction band associated with the planetary gear assembly. When applied, the gear reduction band stops rotation of the secondary primary shaft, causing the planetary gears positioned within the clearance groove in expanded downstream end of the second primary shaft to walk inside the internal gear at a speed slower than the sun gear, which is attached to the inner primary shaft and is turning at engine/input speed. Since the gear reduction band application also slows the carrier and the differential gears it contains, the gear reduction band causes the carrier to rotate at the same speed as the planetary gear assembly, which is less than the speed of the inner primary shaft and gives the present invention as a whole its first gear reduction. When the revolutions per minute are increased, the hydrodynamic conditions in the torque converter tend to approach the same speed around the torus inside the converter. This causes the outer primary shaft, the inner primary shaft, and the secondary primary shaft to run at slightly different rotational speeds. At this point, the gear reduction band is released and the clutch pack is engaged, letting the secondary primary shaft rotate at engine/input speed. Also at this point, the internal gear attached to the secondary primary shaft will be attached mechanically to the stator and the impeller. The turbine is not yet up to engine/input speed, since the hydrostatic lock-up in the torus has not occurred, allowing the inner primary shaft and the turbine to both turn at less than engine/input speed. The inner primary shaft will permit the differential gears and carrier to turn about its axis, thereby reducing the amount of rotational speed transmitted to the output shaft. However, the created speed differential causes an increase in the torque that is applied to the carrier. When the torque converter, stator, and turbine achieve a hydrostatic lock, the speed of the outer primary shaft, secondary primary shaft, and inner primary shaft are then running at the same speed, giving the unit a 1:1 lock-up from the inner primary shaft to the output shaft. This is where the clutch pack is activated to secure a mechanical lock-up to back up the hydrostatic lock between the inner primary shaft and the output shaft. When a hydrostatic lock-up occurs inside the torque converter, the oil spinning inside its torus comes to a stop and the oil is in a hydraulic lock centrifugally. The preferred parking system and governor of the present invention are available as standard Ford products, except for the pawl associated with the parking system, which is new. The reverse band secures a drum positioned between the differential gears and the parking system. When the reverse band is activated to engage the drum, the drum stops the rotation of the carrier, the inner primary shaft, and the output shaft, and then causes the output shaft to rotate in a reverse direction to that of the inner primary shaft.

While the description herein provides preferred embodiments of the present infinitely variable transmission, it should not be used to limit its scope. For example, variations of the present invention, while not shown and described herein, can also be considered within the scope of the present invention, such as variations in the materials from which the components of the present invention can be made; the size and perimeter configuration of many of the present invention components; as well as the relative positioning of some present invention components. Thus, the scope of the present invention should be determined by the appended claims and their legal equivalents, rather than being limited to the examples given.

DETAILED DESCRIPTION OF THE INVENTION

Figure 1:
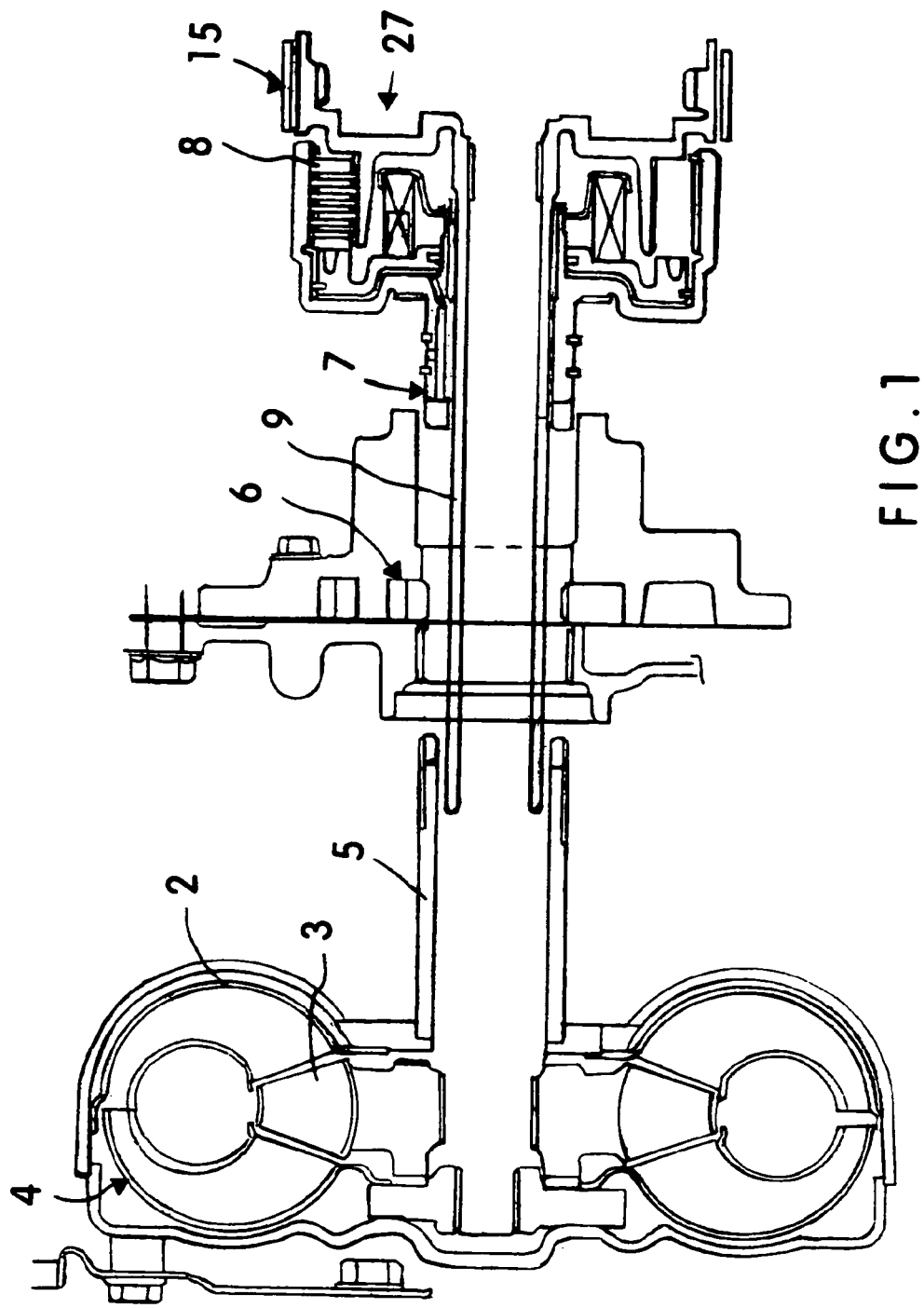
FIG. 1 is a sectional view of the input end of the most preferred embodiment of the present invention showing its outer primary shaft, secondary primary shaft, torque converter, stator, turbine, oil pump, clutch pack, gear reduction band, and the clearance groove in the enlarged downstream end of the secondary primary shaft into which the planetary gear assembly is positioned.

The following explains the progression and torque multiplication process of the present invention infinitely variable geared transmission. Its input shaft 1 from the engine (not shown) rotates the impeller end of the hydrodynamic torque converter 2, which is positioned adjacent to a stator 3 and a turbine 4. As the torque converter 2 rotates, the oil therein is spun outward radially, as illustrated by the arrow 22 in FIG. 2, whereby contact between the moving oil and turbine blades causes the turbine 4 to rotate. The rotating turbine 4 then causes rotation of the inner primary shaft 10, the sun gear 11 attached near to the output end of the inner primary shaft, and the differential gear 13 attached at the downstream end of the inner primary shaft 10. Movement of turbine 4 does not initiate rotation of output shaft 17. However, at this point the outer primary shaft 5 is also turning at engine/input speed. Outer primary shaft 5 always runs at engine/input speed, being driven by the stator. Outer primary shaft 5 rotates the clutch assembly 7 and the oil pump 6, which supplies oil pressure for lubrication and pressure to activate the clutch pack 8. Oil pump 6 also supplies oil pressure for movement of a gear reduction band 15 associated with the planetary gear assembly 12 and a reverse band 20 associated with the beveled differential gears 13 positioned within the carrier 14 that is downstream from the sun gear 11 and planetary gear assembly 14. Oil pump 6 further maintains the proper oil capacity in torque converter 2. When the stator 3 that is adjacent to torque converter 2 is stalled by the discharge of oil in the torus trying to reverse its rotation, such reverse rotation is prevented by engagement of the gear reduction band 15 associated with the planetary gear assembly 12. When tightened, gear reduction band 15 stops the rotation of secondary primary shaft 9, causing the planetary gears 12 positioned within the clearance groove 27 in expanded downstream end of second primary shaft 9 to walk inside the internal gear at a speed slower than the sun gear 11, which is attached to the inner primary shaft 10 and turning at engine/input speed. Since the tightening of gear reduction band 15 also slows the carrier 14 and the differential gears 13 it contains, gear reduction band 15 causes carrier 14 to rotate at the same speed as planetary gear assembly 12, which is less than the speed of the inner primary shaft 10 and gives the present invention as a whole its first gear reduction. When the revolutions per minute are increased, the hydrodynamic conditions in torque converter 2 tend to approach the same speed around the torus inside converter 2. This causes the outer primary shaft 5, the inner primary shaft 10, and the secondary primary shaft 9 to run at slightly different rotational speeds. At this point, the gear reduction band 15 is released and the clutch pack 8 is engaged, letting the secondary primary shaft 9 rotate at engine/input speed. Also at this point, the internal gear attached to the secondary primary shaft 9 will be attached mechanically to the stator 3 and the impeller of torque converter 2. The turbine 4 is not yet up to engine/input speed, since the hydrostatic lock-up in the torus has not occurred, allowing the inner primary shaft 10 and turbine 4 to both turn at a speed less than that of engine/input speed. Inner primary shaft 10 will permit the differential gears 13 and their carrier 14 to turn about its axis, thereby reducing the amount of rotational speed transmitted to output shaft 17. However, the created speed differential causes an increase in the torque that is applied to carrier 14. When the torque converter 2, stator 3, and turbine 4 achieve a hydrostatic lock, the speed of the outer primary shaft 5, secondary primary shaft 9, and inner primary shaft 10 are then running at the same speed, giving the unit a 1:1 lock-up from the inner primary shaft 10 to output shaft 17. This is where the clutch pack 8 is activated to secure a mechanical lock-up to back up the hydrostatic lock between the inner primary shaft 10 and output shaft 17. At this point the engine speed and speed of output shaft 17 are the same. When a hydrostatic lock-up occurs inside torque converter 2, the oil spinning inside its torus (the direction of which is indicated by arrow 22) comes to a stop and the oil is in a hydrostatic lock centrifugally. The preferred parking system 23 and governor 16 of the present invention are available as standard Ford products, except for the pawl 24 associated with parking system 23, which is new. The reverse band 20 secures a drum 21 positioned around a portion of carrier 14 between the differential gears 13 and the parking system 23. When the reverse band 20 is tightened to engage drum 21, the drum 21 stops the rotation of the carrier 14, the inner primary shaft 10, and the output shaft 17, and then causes output shaft 17 to rotate in a reverse direction to that of the inner primary shaft 10. Further, the detail of the valve body required for use with the present invention is not shown, and will be designed conventionally according to the intended application.

Figure 2:
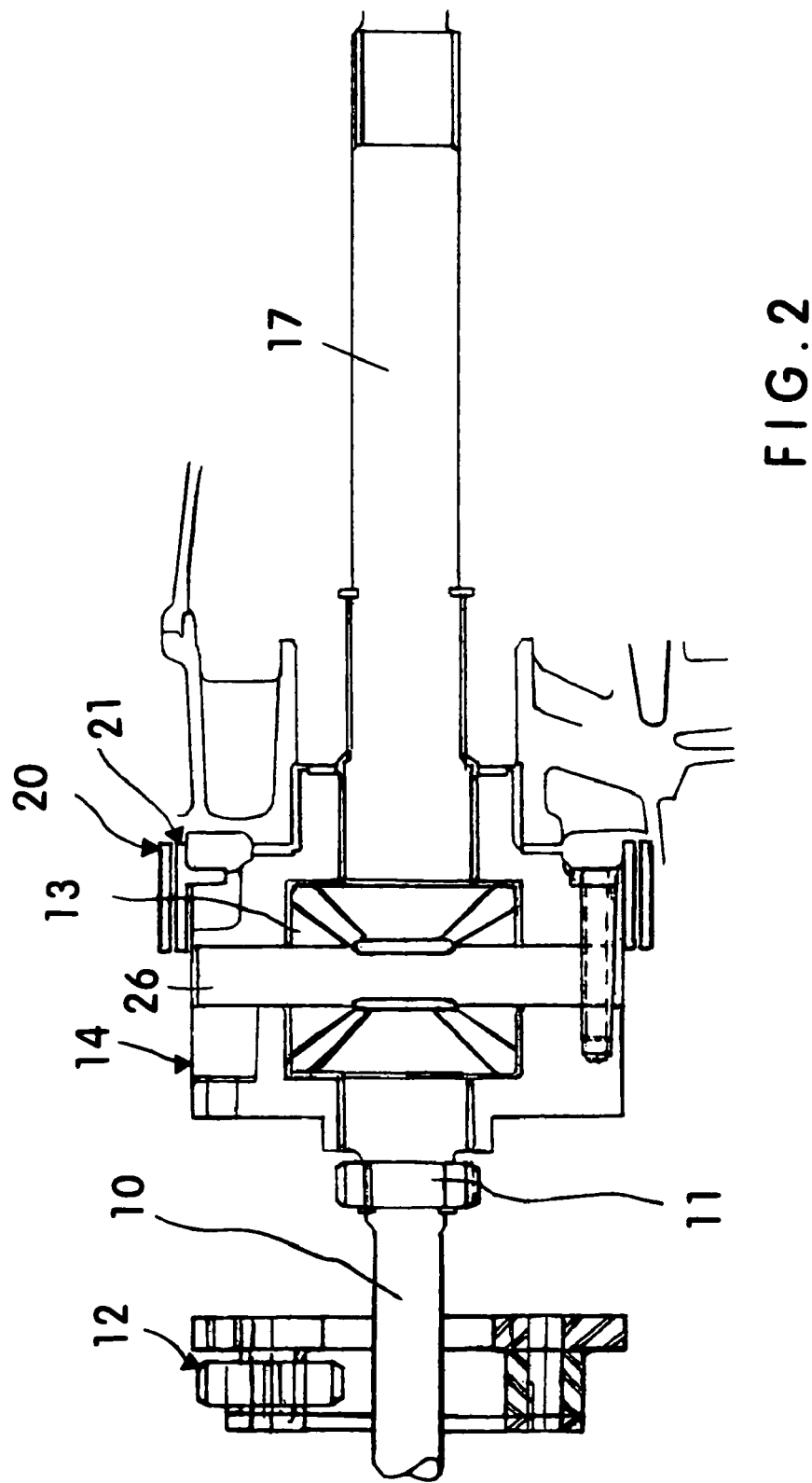
FIG. 2 is a side view of the output end of the most preferred embodiment of the present invention showing its sun gear, a planetary gear assembly positioned upstream from the sun gear, the differential gears positioned in a carrier downstream from the sun gear, the inner primary shaft, the output shaft, a reverse band, and drum.
Figure 3:
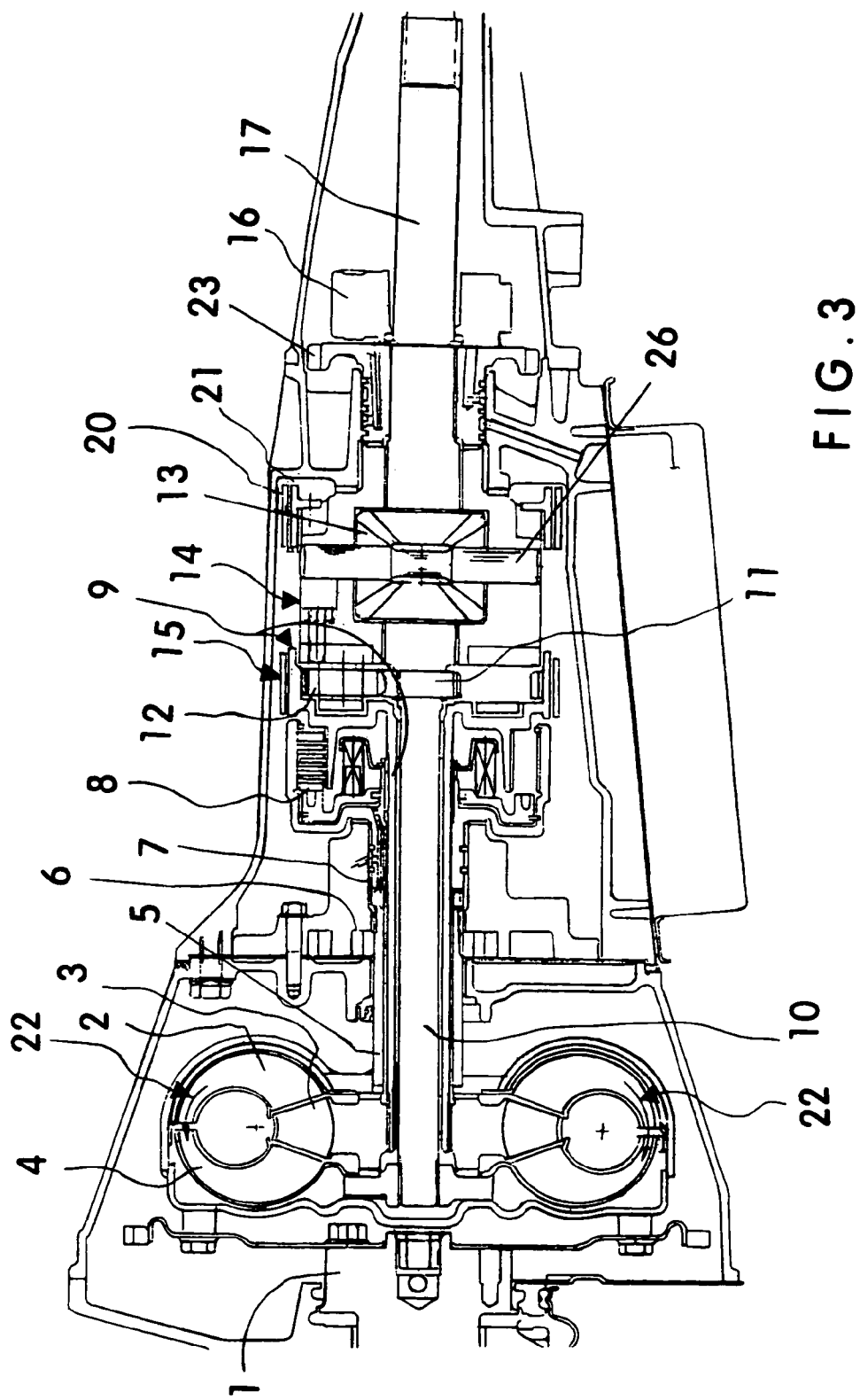
FIG. 3 is a sectional view of the most preferred embodiment of the present invention showing both input and output ends connected to one another, in addition to the governor and parking system, and with arrows showing the direction of oil movement.

FIGS. 1–3 show the most preferred embodiment of the present invention. FIG. 1 shows the relative positioning of outer primary shaft 5, secondary primary shaft 9, torque converter 2, stator 3, and turbine 4, with turbine 4 providing the rotational communication between the input shaft 1 from an associated engine (not shown) and the inner primary shaft 10 (which are both shown in FIG. 3). In addition, FIG. 1 shows oil pump 6 positioned downstream from outer primary shaft 5, with clutch assembly 7 and clutch pack 8 positioned downstream from oil pump 6. FIG. 1 further shows the gear reduction band 15 positioned around the enlarged downstream end of secondary primary shaft 9 having the clearance groove 27 which houses the planetary gear assembly 12 when input and output ends of the present invention are connected. When gear reduction band 15 is tightened, it stops the rotation of secondary primary shaft 9, causing the planetary gears 12 (shown in FIGS. 2 and 3) to walk inside the internal gear at a speed slower than the sun gear 11 (also shown in FIGS. 2 and 3), which is turning at engine/input speed. Since the tightening of gear reduction band 15 also slows the carrier 14 and the differential gears 13 it contains (as illustrated in FIG. 3), gear reduction band 15 causes carrier 14 to rotate at the same speed as planetary gear assembly 12, which is less than the speed of the inner primary shaft 10 and gives the present invention as a whole its first gear reduction.

Figure 8:
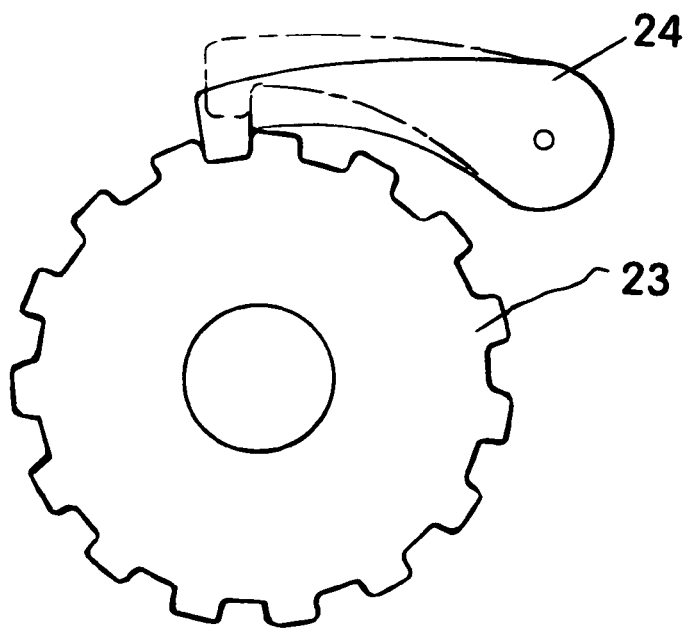
FIG. 8 is an end view of the parking system used as a part of the most preferred embodiment of the present invention, with broken lines depicting its pawl in a non-engaged position.
Figure 9:
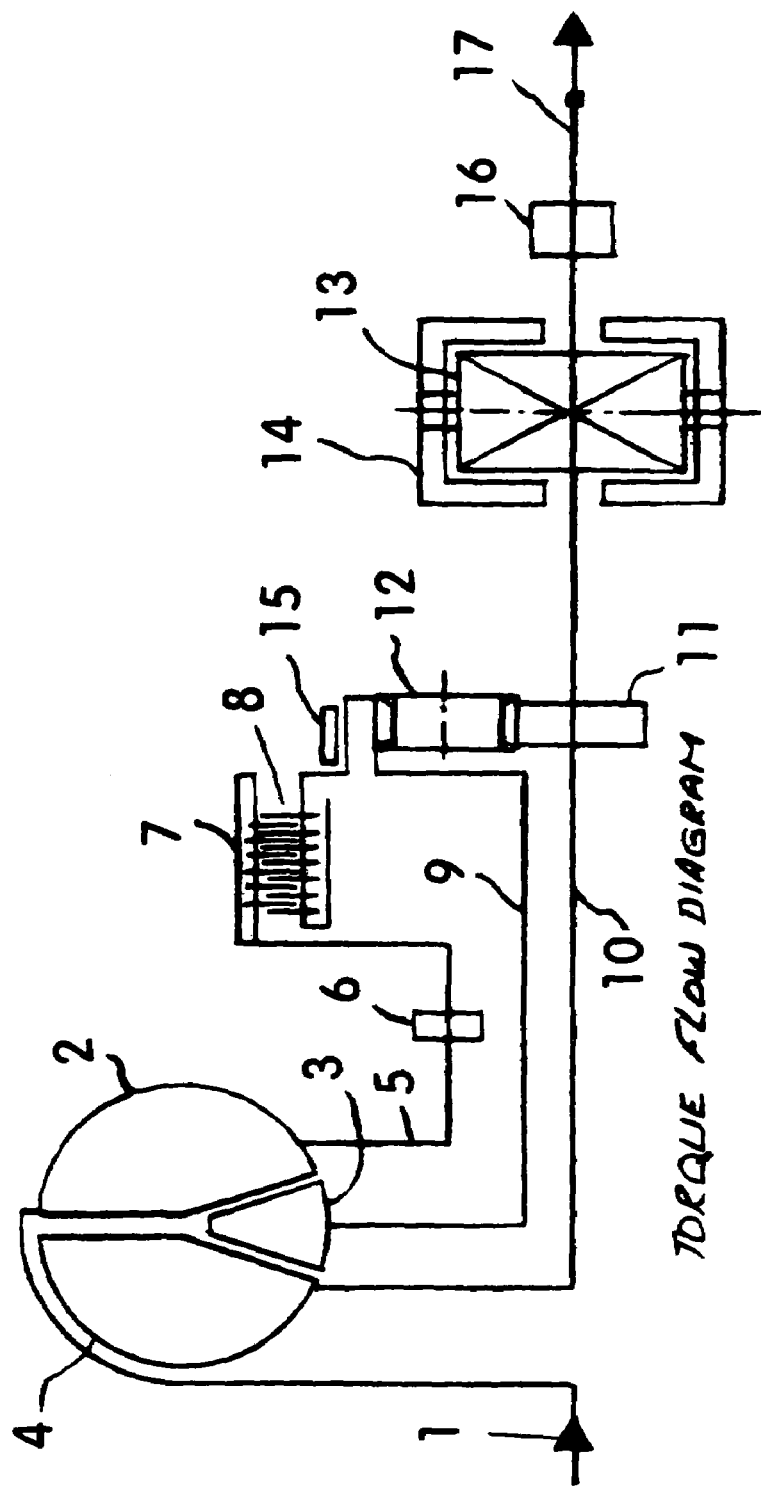
FIG. 9 is a torque flow diagram for the most preferred embodiment of the present invention.

FIG. 2 shows the output end of the most preferred embodiment of the present invention with planetary gear assembly 12 upstream from sun gear 11 that is attached to inner primary shaft 10, while FIG. 3 shows the input and output ends connected with the inner primary shaft 10 positioned within the secondary primary shaft 9, thereby concentrically positioning the sun gear 11 within the planetary gear assembly 12. FIGS. 2 and 3 further show four beveled differential gears 13 positioned within a carrier 14 downstream from sun gear 11, with reverse band 20 and drum 21 situated for tightening around the middle portion of carrier 14. FIGS. 2 and 3 show one beveled differential gear 13 attached to the downstream end of inner primary shaft 10, and a second beveled differential gear 13 attached to the upstream end of output shaft 17. In addition, FIGS. 2 and 3 show two additional beveled gears 13 being attached to spider gear pinion shaft 26 in positions directly opposed to one another within carrier 14 so as to engage the two opposing beveled differential gears 13 attached to inner primary shaft 10 and output shaft 17. FIGS. 2 and 3 also show reverse band 20 and drum 21 positioned for tightening around carrier 14 to stop the rotation of carrier 14, inner primary shaft 10, and output shaft 17, whereafter output shaft 17 is caused to rotate in a reverse direction to that of the inner primary shaft 10. FIG. 3 further shows the parking system 23 and governor 16 positioned concentric to output shaft 17 downstream from carrier 14. The preferred pawl 24 used with the present invention parking system 23 is shown in FIG. 8. A torque flow diagram for the most preferred embodiment of the present invention is also provided as FIG. 9.

Figure 4:
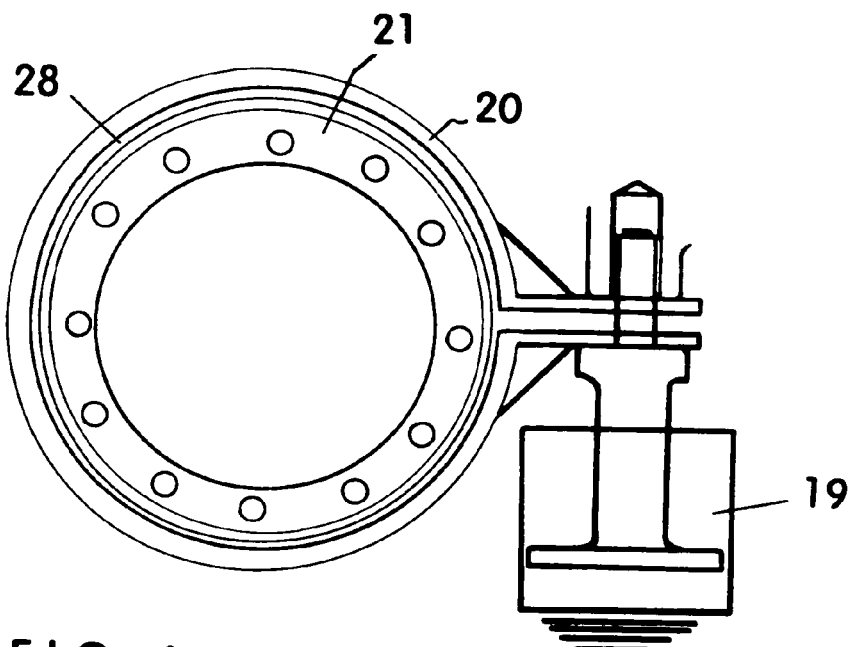
FIG. 4 is a rearward view of the output end of the most preferred embodiment of the present invention showing its drum, reverse band, the clearance between drum and reverse band, and reverse servo.
Figure 5:
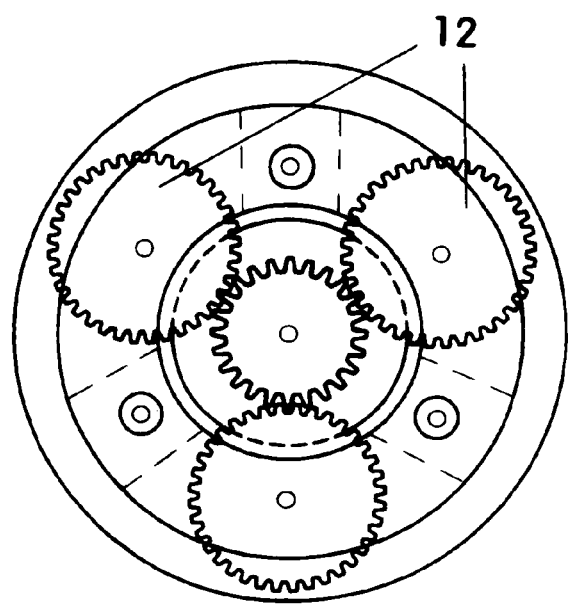
FIG. 5 is an end view of the planetary gear assembly used in the most preferred embodiment of the present invention.
Figure 7:
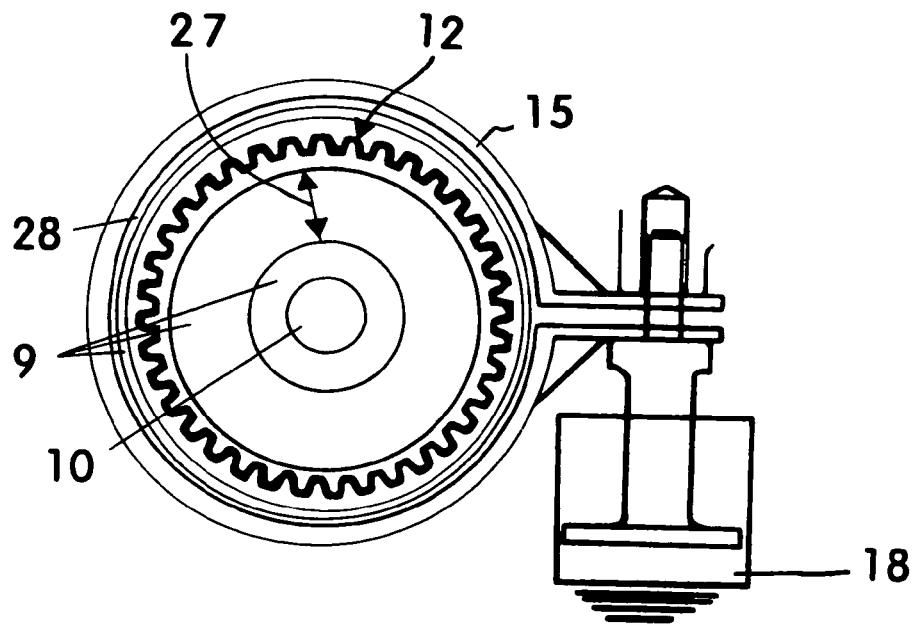
FIG. 7 is a rear end view of the inner primary shaft in the most preferred embodiment of the present invention and servo, with a gear reduction band around the geared portion of the shaft, the secondary primary shaft, and clearance grooves for band tightening also being shown.

FIGS. 4 and 5 respectively show the output end of the most preferred embodiment of the present invention with its drum 21, reverse band 20, and reverse servo 19, and the front end of the planetary gear assembly 12 also used in the most preferred embodiment of the present invention. Reverse servo 19 and the servo 18 shown in FIG. 7 are hydraulic and of common design. When reverse band 20 is tightened around drum 21 to stop the rotation of carrier 14, the rotation of inner primary shaft 10 and output shaft 17 is also stopped, whereafter output shaft 17 is caused to rotate in a reverse direction to that of inner primary shaft 10. FIG. 5 shows planetary gear assembly 12 having a three-geared structure. Although it is not critical, the three-geared structure for planetary gear assembly 12 is preferred.

Figure 6:
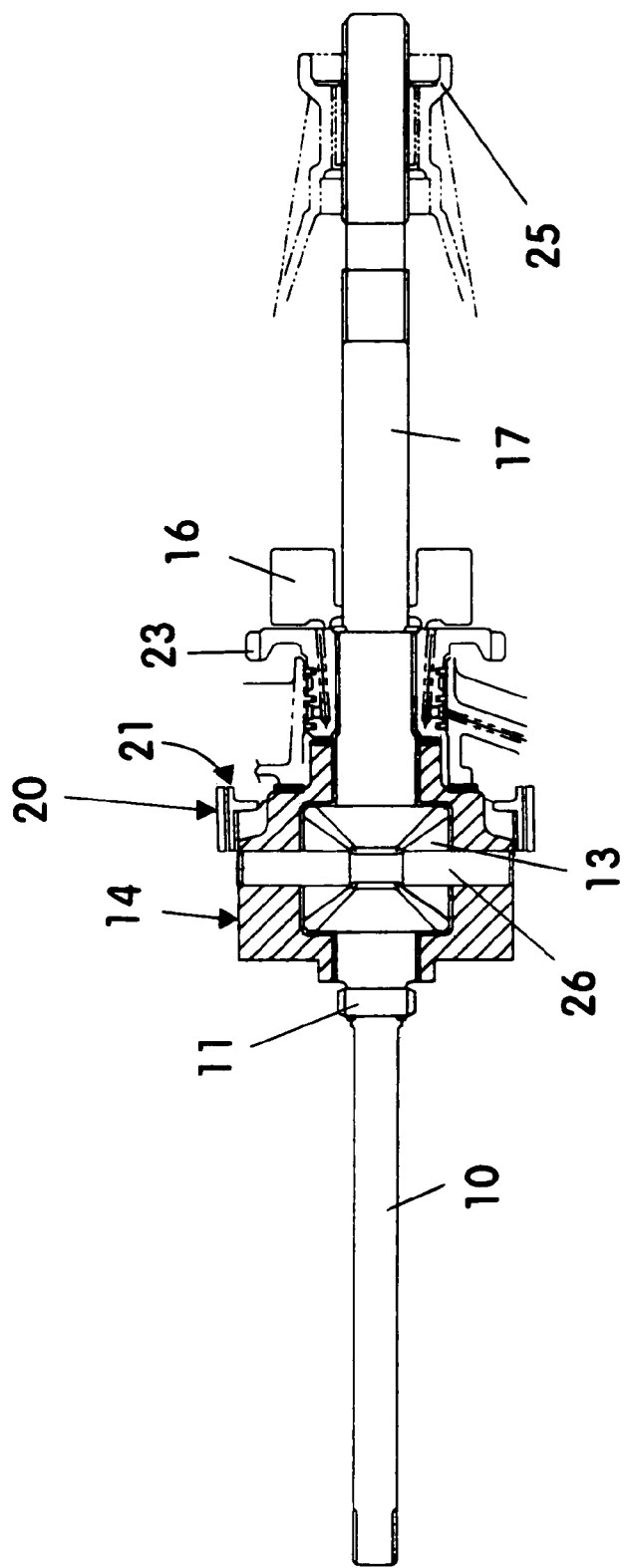
FIG. 6 is a side view of the inner primary shaft and the output shaft of the most preferred embodiment of the present invention showing the downstream end of the inner primary shaft and the upstream end of the output shaft being connected to opposing ones of the four beveled differential gears within a carrier centrally position the two shafts, the two opposed beveled gears also being positioned within the carrier and connected to a spider gear pinion shaft, with FIG. 6 further showing a sun gear positioned upstream to the carrier, a drum positioned to engage a portion of the carrier, a reverse band positioned for being tightened around the drum, and a governor and parking system positioned downstream from the carrier.

FIG. 6 shows the inner primary shaft 10 and the output shaft 17 of the most preferred embodiment of the present invention with the downstream end of the inner primary shaft 10 and the upstream end of the output shaft 17 each being connected to one of the four beveled differential gears 13 within carrier 14. The beveled gears 13 attached to inner primary shaft 10 and output shaft 17 engage two opposed beveled gears also positioned within carrier 14 that are connected to a spider gear pinion shaft 26. FIG. 6 also shows sun gear 11 attached to inner primary shaft 10 and positioned upstream from carrier 14, as well as drum 21 positioned around the middle portion of carrier 14 and prepared to engage it to stop its rotation. Reverse band 20 is positioned for tightening around drum 21, so that when reverse band 20 is activated it engages drum 21 to stop rotation of carrier 14, as well as the rotation of inner primary shaft 10, and output shaft 17, whereafter the output shaft 17 is caused to rotate in a reverse direction to that of inner primary shaft 10. FIG. 6 further shows the downstream positioning of governor 16 and parking system 23 relative to carrier 14, as well as a small portion of the present invention tail housing 25.

FIG. 7 shows the inner primary shaft 10 in the most preferred embodiment of the present invention and servo 18, with gear reduction band 15 around the geared portion of shaft 10 that would contain the planetary gear assembly 12. Servo 18 is hydraulic and of common design. Positioned immediately interior to gear reduction band 15, FIG. 7 also shows a band/shaft clearance groove 28, with various portions of enlarged downstream end of secondary primary shaft 9 shown between inner primary shaft 10 and the planetary gear assembly 12, including the clearance groove 27 that is also identified in FIG. 1. Gear reduction band 15 is positioned to stop the rotation of secondary primary shaft 9 and slow the rotation of the planetary gear assembly 12, as well as slow the carrier 14 that houses differential gears 13. When gear reduction band 15 is released, clutch pack 8 is engaged to bring the rotational speed of secondary primary shaft 9 to engine/input speed, until hydrostatic lock is achieved.

FIG. 8 shows the parking system 23 for the most preferred embodiment of the present invention and its associated pawl 24. Solid lines for pawl 24 show its engaged position with parking system 23, while broken lines show its non-engaged position relative to parking system 23. The configurations of pawl 24 and parking system 23 shown in FIG. 8 are preferred, but not critical. The preferred parking system 23 of the present invention is a standard parking system used on Ford products, except for the pawl 24, which is new. The preferred location of parking system 23 is downstream from differential gears 13, adjacent to governor 16.

What is claimed is:

1. An infinitely variable transmission comprising:
   a torque converter with a stator and an impeller end, said torque converter also configured for rotation and hydrostatic lock-up as revolutions increase;
   an input shaft in rotational communication with said impeller end of said torque converter;
   an oil pump providing oil to said torque converter;
   a turbine positioned for rotation by the oil spun by said torque converter as said torque converter is rotated by said input shaft;
   an inner primary shaft positioned for rotation by said turbine and having a downstream end;
   an outer primary shaft positioned for initial rotation at input speed by said stator, said outer primary shaft also being concentric with and positioned exterior to said inner primary shaft, as well as in rotational communication with said oil pump;
   a secondary primary shaft being positioned between said inner and outer primary shafts and having an enlarged downstream end with a clearance groove;
   a gear reduction band positioned around said enlarged downstream end of said secondary primary shaft;
   a planetary gear assembly having a plurality of planetary gears and an internal gear, said planetary gear assembly positioned at least in part within said clearance groove in said enlarged downstream end of said secondary primary shaft;
   a sun gear supported for rotation by said inner primary shaft, positioned concentrically on said inner primary shaft and within said planetary gear assembly, and configured for engagement with said planetary gear assembly;
   an output shaft with an upstream end; and
   a carrier containing a plurality of beveled differential gears, and one of said beveled differential gears being in an upstream position relative to the remaining ones of said beveled differential gears, and another of said beveled differential gears being in a downstream position relative to the remaining ones of said beveled differential gears, with said upstream one of said beveled gears being attached to said downstream end of said inner primary shaft and said downstream one of said beveled gears being attached to said upstream end of said output shaft, said carrier also being positioned for contact with said gear reduction band whereby when said gear reduction band is tightened, it stops the rotation of said secondary primary shaft, causing said planetary gears to walk inside said internal gear at a speed slower than said sun gear which is turning at input speed, and since the tightening of said gear reduction band also slows rotation of said carrier and said differential gears, tightening of said gear reduction band causes said carrier to rotate at the same speed as said planetary gear assembly, which is less than the speed of said inner primary shaft and gives said transmission as a whole its first gear reduction, and as engine speed increases, said inner primary shaft, said outer primary shaft, and said secondary primary shaft start to run at slightly different rotational speeds until hydrostatic lock-up occurs in said torque converter whereby a 1:1 lock-up is created from said inner primary shaft to said output shaft.

2. The transmission of claim 1 further comprising reverse means adapted for stopping rotation of said inner primary shaft and said output shaft, and thereafter causing said output shaft to rotate in a reverse direction to that of said inner primary shaft.

3. The transmission of claim 2 wherein said reverse means comprises a drum positioned around a portion of said carrier different from that in contact with said gear reduction band and a reverse band situated around said drum for tightening it and stopping rotation of said carrier.

4. The transmission of claim 1 further comprising parking means adapted for stopping rotation of said output shaft.

5. The transmission of claim 4 wherein said parking means comprises at least one gear and a pawl.

6. The transmission of claim 1 further comprising a clutch assembly associated with said secondary primary shaft that is configured to provide a mechanical lock-up to back up the 1:1 lock-up from said inner primary shaft to said output shaft caused by said hydrostatic lock-up in said torque converter.

7. The transmission of claim 1 wherein said planetary gear assembly comprises a three-geared construction.

8. The transmission of claim 1 further comprising a governor positioned concentric to said output shaft downstream from said carrier.

9. An infinitely variable transmission comprising:
   a torque converter with a stator and an impeller end, said torque converter also configured for rotation and hydrostatic lock-up as revolutions increase;
   an input shaft in rotational communication with said impeller end of said torque converter;
   an oil pump providing oil to said torque converter;
   a turbine positioned for rotation by the oil spun by said torque converter as said torque converter is rotated by said input shaft;
   a secondary primary shaft, an output shaft with an upstream end, and an inner primary shaft;
   a clutch assembly associated with said secondary primary shaft, said clutch assembly configured to provide a mechanical lock-up to back up the 1:1 lock-up from said inner primary shaft to said output shaft caused by said hydrostatic lock-up in said torque converter;
   said inner primary shaft positioned for rotation by said turbine and having a downstream end, said inner primary shaft configured to drive said oil pump and said clutch assembly;
   an outer primary shaft positioned for initial rotation at input speed by said stator, said outer primary shaft also being concentric with and positioned exterior to said inner primary shaft, as well as in rotational communication with said oil pump;
   said secondary primary shaft being positioned between said inner and outer primary shafts and having an enlarged downstream end with a clearance groove;
   a gear reduction band positioned around said enlarged downstream end of said secondary primary shaft;
   a planetary gear assembly having a plurality of planetary gears and an internal gear, said planetary gear assembly positioned at least in part within said clearance groove in said enlarged downstream end of said secondary primary shaft;
   a sun gear supported for rotation by said inner primary shaft, positioned concentrically on said inner primary shaft and within said planetary gear assembly, and configured for engagement with said planetary gear assembly;

a carrier containing a plurality of beveled differential gears, one of said beveled differential gears being in an upstream position relative to the remaining ones of said beveled differential gears and another of said beveled differential gears being in a downstream position relative to the remaining ones of said beveled differential gears, with said upstream one of said beveled gears being attached to said downstream end of said inner primary shaft and said downstream one of said beveled gears being attached to said upstream end of said output shaft, said carrier also being positioned for contact with said gear reduction band;

a governor positioned concentric to said output shaft downstream from said carrier;

reverse means adapted for stopping rotation of said inner primary shaft and said output shaft, and thereafter causing said output shaft to rotate in a reverse direction to that of said inner primary shaft; and parking means adapted for stopping rotation of said output shaft, whereby when said gear reduction band is tightened, it stops the rotation of said secondary primary shaft, causing said planetary gears to walk inside said internal gear at a speed slower than said sun gear which is turning at input speed, and since the tightening of said gear reduction band also slows rotation of said carrier and said differential gears, tightening of said gear reduction band causes said carrier to rotate at the same speed as said planetary gear assembly, which is less than the speed of said inner primary shaft and gives said transmission as a whole its first gear reduction, and as engine speed increases, said inner primaryy shaft, said outer primary shaft, and said secondary primary shaft start to run at slightly different rotational speeds until said hydrostatic lock-up occurs in said torque converter whereby a 1:1 lock-up is created from said inner primary shaft to said output shaft, and wherein said clutch assembly provides a mechanical lock-up to back up said hydrostatic lock-up in said torque converter.

10. The transmission of claim 9 wherein said parking means comprises at least one gear and one pawl.

11. The transmission of claim 9 wherein said planetary gear assembly comprises a three-geared construction.

12. The transmission of claim 9 wherein said reverse means comprises a drum positioned around a portion of said carrier different from that in contact with said gear reduction band and a reverse band that is situated around said drum and configured for sufficiently tightening said drum to stop rotation of said carrier.

13. A method of manufacturing an infinitely variable transmission comprising the steps of:

providing an input shaft, a torque converter, a stator, an input shaft, an oil pump, a turbine, an inner primary shaft, an outer primary shaft, a secondary primary shaft having an enlarged downstream end with a clearance groove, a gear reduction band, a planetary gear assembly with a plurality of planetary gears and an internal gear, a sun gear, an output shaft, and a carrier containing a plurality of beveled differential gears with one of said beveled differential gears being in an upstream position relative to the remaining ones of said beveled differential gears and another of said beveled differential gears being in a downstream position relative to the remaining ones of said beveled differential gears;

placing said input shaft in rotational communication with said impeller end of said torque converter;

associating said stator with said torque converter and said turbine;

positioning said oil pump to provide oil to said torque converter;

positioning said turbine for rotation by the oil spun by said torque converter when said torque converter is rotated by said input shaft;

positioning said inner primary shaft for rotation by said turbine;

positioning said outer primary shaft for initial rotation at input speed by said stator;

positioning said secondary primary shaft between said inner and outer primary shafts;

positioning said gear reduction band around said enlarged downstream end of said secondary primary shaft;

positioning said planetary gear assembly at least in part within said clearance groove in said enlarged downstream end of said secondary primary shaft;

supporting said sun gear for rotation by said inner primary shaft;

positioning said sun gear concentrically within said planetary gear assembly for engagement with said planetary gears;

attaching said upstream one of said beveled differential gears to said downstream end of said inner primary shaft and said downstream one of said beveled differential gears to said upstream end of said output shaft; and positioning said carrier for contact with said enlarged downstream end of said secondary primary shaft whereby when said gear reduction band is tightened, it stops the rotation of said secondary primary shaft, causing said planetary gears to walk inside said internal gear at a speed slower than said sun gear which is turning at input speed, and since the tightening of said gear reduction band also slows rotation of said carrier and said differential gears, tightening of said gear reduction band causes said carrier to rotate at the same speed as said planetary gear assembly, which is less than the speed of said inner primary shaft and gives said transmission as a whole its first gear reduction, and as engine speed increases, said inner primary shaft, said outer primary shaft, and said secondary primary shaft start to run at slightly different rotational speeds until hydrostatic lock-up occurs in said torque converter whereby a 1:1 lock-up is created from said inner primary shaft to said output shaft.

14. The method of claim 13 wherein the order of accomplishing said steps of placing, associating, attaching, supporting, and positioning is interchangeable.

15. The method of claim 13 further comprising the step of providing reverse means adapted for stopping rotation of said inner primary shaft and said output shaft and thereafter causing said output shaft to rotate in a reverse direction to that of said inner primary shaft and the step of positioning said reverse means in association with a portion of said carrier different from that in contact with said gear reduction band.

16. The method of claim 15 wherein said reverse means comprises a drum and a reverse band, and further comprising the step of situating said reverse band around said drum.

17. The method of claim 13 further comprising the step of providing a governor, and the step of positioning said governor concentric to said output shaft downstream from said carrier.

18. The method of claim 13 further comprising the steps of providing a clutch assembly and associating said clutch assembly with said secondary primary shaft whereby engagement of said clutch assembly provides a mechanical lock-up to back up said hydrostatic lock-up in said torque converter.

19. The method of claim 13 further comprising parking means adapted for stopping rotation of said output shaft.

20. The method of claim 19 wherein said parking means comprises at least one gear and a pawl.

* * * * *